United States Patent Office 3,388,164
Patented June 11, 1968

3,388,164
METHOD OF PREPARING 1-ADAMANTANAMINE
William Vincent Curran and Robert Bruce Angier, Pearl River, N.Y., assignors to American Cyanamid Company, Stamford, Conn., a corporation of Maine
No Drawing. Filed Jan. 4, 1966, Ser. No. 518,531
1 Claim. (Cl. 260—563)

This invention relates to a novel method for the preparation of 1-adamantanamine. More specifically, this invention provides a process for the two-step synthesis of 1-adamantanamine employing adamantane-1-carboxylic acid as the starting material.

1-adamantanamine possesses significant antiviral activity and causes a selective, reproducible, dose-related inhibition of influenza infections in tissue culture, chick embryos, and mice. The compound is not virucidal and appears to act by interfering with the penetration of the host cell by the virus. In influenza infections in mice, greatest efficacy occurs with treatment at the time of infection; however, there is significant antiviral activity with treatment delayed up to 72 hours after infection. Virus inhibition is not complete and survivors are immune to a challenge infection with the original infecting virus.

Prior art in the synthesis of 1-adamantanamine includes a method wherein 1-bromoadamantane is converted into an amide derivative by a Ritter reaction. A subsequent alkaline hydrolysis of the amide produces the amine. A particular disadvantage of this process is caused by the difficulty in carrying out the amide hydrolysis which ordinarily proceeds only under severe conditions. For example, an alkaline hydrolysis using ethylene glycol as solvent produces a mixture of both the glycol substituted product and the desired 1-adamantanamine. An attempted acid hydrolysis of the amide intermediate using concentrated hydrochloric acid produces 1-chloroadamantane in 98% yield. Literature references to processes for obtaining 1-adamantanamine include Haaf, W., Angew. Chem., 73, 144 (1961) and Ber., 96, 3359 (1963); Stetter, H., et. al., Ber., 93, 226 (1960) and Ber., 92, 1629 (1959); and Fort and Schleyer, Chemical Reviews, 64, 277 (1964).

The steps involved in the novel process of the present invention may be depicted as follows:

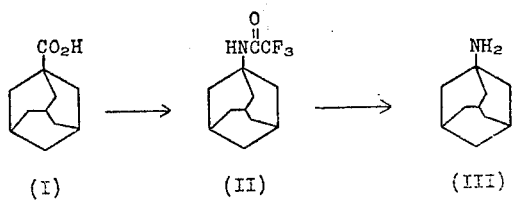

The starting material for the novel process of the present invention is adamantane-1-carboxylic acid, ($C_{10}H_{15}$—$CO_2H$) (I) which is converted to 1-trifluoroacetamidoadamantane $$(C_{10}H_{15}\text{---}NH\overset{O}{\overset{\|}{C}}CF_3)$$

(II) by treatment with sodium azide in a solvent system consisting of a mixture of trifluoroacetic acid and trifluoroacetic anhydride. An approximately equimolar quantity of sodium azide is employed and the ratio of trifluoroacetic acid to trifluoroacetic anhydride may vary from about 5:1 to about 1:5. The reaction is carried out at a temperature of from about −5° C. to about 10° C. and ordinarily the reaction proceeds smoothly to yield a residue upon evaporation of the solvents. Decomposition of the residue with ice-water affords the intermediate 1-trifluoroacetamidoadamantane (II).

The intermediate 1-trifluoroacetamidoadamantane (II) is then converted to 1-adamantanamine, ($C_{10}H_{15}$—$NH_2$) (III) by mild alkaline hydrolysis in methanol at room temperature. Approximately 10 ml. of 1N NaOH per gram of amide may be conveniently employed in about 10–20 ml. of methanol per gram of amide as solvent. Upon evaporation, the crystalline 1-adamantanamine (III) is obtained. Further purification of the end product may be achieved by sublimation in vacuo.

The chief advantages of the present method as applied to the synthesis of 1-adamantanamine is in its direct two-step procedure and the ease of hydrolysis of the trifluoroacetamide compound to the amine. A further advantage of this synthesis is the relatively good yield obtained, slightly more than 50%.

The invention will be described in greater detail in conjunction with the following specific examples.

EXAMPLE 1

Preparation of 1-trifluoroacetamidoadamantane

Adamantane-1-carboxylic acid (4.4 g., 24.6 mmoles) was dissolved in a stirred mixture of trifluoroacetic acid (25 ml.) and trifluoroacetic anhydride (10 ml.) in an ice-bath. Sodium azide (1.6 g., 24.6 mmoles) was added in several portions over a period of 5.0 minutes. The mixture was stirred for 0.5 hour in the ice-bath, then 1.0 hour at room temperature. Evaporation of excess solvents at reduced pressure on a warm water-bath followed by decomposition of the residue with ice-water afforded a white crystalline product; yield 5.0 g., M.P. 271–274° C. dec.

EXAMPLE 2

Preparation of 1-adamantanamine 1-trifluoroacetamidoadamantane (2.0 g.) was dissolved in a mixture of 25 ml. of methanol and 20 ml. of 1 N sodium hydroxide. The reaction mixture was allowed to stand at room temperature for 20 minutes followed by evaporation to about half the original volume. The remainder was chilled and the crystalline product collected; yield 0.6 g. The infrared spectrum of the crystalline product is identical with the infrared spectrum of authentic 1-adamantanamine.

What is claimed is:

1. The method of preparing 1-adamantanamine which comprises reacting adamantane-1-carboxylic acid with sodium azide in a solvent system consisting essentially of a mixture of trifluoroacetic acid and trifluoroacetic anhydride to form 1-trifluoroacetamidoadamantane, and hydrolyzing said 1-trifluoroacetamidoadamantane to obtain 1-adamantanamine.

References Cited

UNITED STATES PATENTS 3,310,469   3/1967   Paulshock et al. _____ 260—563

CHARLES B. PARKER, Primary Examiner.

P. C. IVES, Assistant Examiner.